United States Patent
Tofukuji (10) Patent No.: US 8,140,208 B2
(45) Date of Patent: Mar. 20, 2012

(54) ELECTRIC DRIVE VEHICLE

(75) Inventor: Satoko Tofukuji, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/056,072

(22) PCT Filed: Nov. 30, 2009

(86) PCT No.: PCT/JP2009/070133
§ 371 (c)(1),
(2), (4) Date: Jan. 26, 2011

(87) PCT Pub. No.: WO2011/064892
PCT Pub. Date: Jun. 3, 2011

(65) Prior Publication Data
US 2012/0016545 A1    Jan. 19, 2012

(51) Int. Cl.
*B60K 6/46* (2007.10)
*B60W 20/00* (2006.01)

(52) U.S. Cl. .............. 701/22; 180/65.21; 180/65.31; 180/65.245; 903/904; 318/139; 290/40 C; 290/45

(58) Field of Classification Search .......... 290/11; 320/DIG. 34; 903/930
See application file for complete search history.

(56) References Cited

U.S. PATENT DOCUMENTS

| 7,224,132 | B2 * | 5/2007 | Cho et al. ............. 318/139 |
| 2006/0162973 | A1 * | 7/2006 | Harris et al. ............ 180/65.3 |
| 2008/0017426 | A1 * | 1/2008 | Walters et al. ........... 180/65.2 |
| 2011/0226539 | A1 * | 9/2011 | Huss et al. .............. 180/65.21 |

FOREIGN PATENT DOCUMENTS

| JP | 63-149336 U | 9/1988 |
| JP | 07-327322 A | 12/1995 |
| JP | 2002-309958 A | 10/2002 |
| JP | 2002-321682 A | 11/2002 |
| JP | 2003-286000 A | 10/2003 |
| JP | 2007-238013 A | 9/2007 |
| JP | 2008-113554 A | 5/2008 |

* cited by examiner

*Primary Examiner* — Thomas Black
*Assistant Examiner* — Lin B Olsen
(74) *Attorney, Agent, or Firm* — Kenyon & Kenyon LLP (57) ABSTRACT

In an electric drive vehicle equipped with a power generating unit that is detachable, the power generating unit includes a power-generating-unit side ECU capable of controlling an operation of the power generating unit solely, and the electric drive vehicle includes a vehicle-side ECU capable of managing a state of charge of a battery used for running, and in a case where the power generating unit is installed in the electric drive vehicle and power is supplied to the battery from the power generating unit, an instruction by the vehicle-side ECU is given priority to an instruction by the power-generating-unit side ECU, and the vehicle-side ECU controls the operation of the power generating unit.

3 Claims, 5 Drawing Sheets

| TYPE OF GENERATOR | MEASUREMENT ITEM | MEASUREMENT CRITERION | RELATED REGULATION |
|---|---|---|---|
| SPARK IGNITION TYPE INTERNAL COMBUSTION ENGINE | EXHAUST GAS | CO: ~A1 g/hour | EXHAUST REGULATION |
| | TRAVEL DISTANCE AMOUNT OF STATE OF CHARGE | A2 ~ km/% | FUEL ECONOMY REGULATION |
| | LEAKAGE | A3 ~mV/hour | FAULT DIAGNOSIS |
| AUTO-IGNITION TYPE INTERNAL COMBUSTION ENGINE | EXHAUST GAS | CO: ~B1 g/hour | EXHAUST REGULATION |
| | TRAVEL DISTANCE AMOUNT OF STATE OF CHARGE | B2 ~ km/% | FUEL ECONOMY REGULATION |
| | LEAKAGE | B3 ~mV/hour | FAULT DIAGNOSIS |
| FUEL CELL TYPE | TRAVEL DISTANCE AMOUNT OF STATE OF CHARGE | C1 ~ km/% | FUEL ECONOMY REGULATION |
| | LEAKAGE | C2 ~mV/hour | FAULT DIAGNOSIS |
| ⋮ | ⋮ | ⋮ | ⋮ |

ELECTRIC DRIVE VEHICLE

This is a 371 national phase application of PCT/JP2009/070133 filed 30 Nov. 2009, the content of which is incorporated herein by reference.

TECHNICAL FIELD

The present invention relates to electric drive vehicles.

BACKGROUND ART

Conventionally, there is known a mobile power supply vehicle in which a power generating unit equipped with an engine and a generator driven by the engine is detachably mounted in a loading space (see Patent Document 1, for example). In the mobile power supply vehicle, the power generating unit may be removed from the vehicle. There is known a sound insulation type generator configured to have a detachable generator main body and a control device that controls the voltage generated by the generator main body (see Patent Document 2, for example).

There is known an electric connection making box in which multiple ECUs (Electronic Control Units) for controlling various output devices may be detachably installed and power may be supplied to installed ECUs or stopped (see Patent Document 3, for example). The electric connection making box has a backup means that monitors communications with the connected ECUs among the multiple ECUs. The backup means backs up data stored in the connected ECUs when determining that power supply to the connected ECUs is now allowed, and then stops supplying power to the connected ECUs.

Conventionally, there is known an electric drive vehicle equipped with a battery that is usable for traveling. The electric drive vehicle may be a golf cart, a forklift, a construction machine or the like. A high degree of freedom of movement may be secured by designing the electric drive vehicle to use a battery to supply power to a driving drive source.

PRIOR ART DOCUMENTS

Patent Documents

Patent Document 1: Japanese Utility Model Application Publication No. 63-149336
Patent Document 2: Japanese Patent Application Publication No. 2002-309958
Patent Document 3: Japanese Patent Application Publication No. 2008-113554

SUMMARY OF THE INVENTION

Problems to be Solved by the Invention

The above-described electric drive vehicles are equipped with an ECU for executing various controls. The generator is equipped with an ECU for controlling the operation of the generator to enable independent operation. Thus, in a case where the detachable generator for supplying power to the battery is installed in the electric drive vehicle, both the electric drive vehicle and the detachable generator are equipped with the respective ECUs. Both the ECU installed in the electric drive vehicle and the ECU installed in the generator issue instructions about the operation control of the generator, and the operation control of the generator may be confused. In a case where the battery is charged taking the condition of the battery into consideration, it is required that either one of the ECUs executes the operation control of the generator.

The above-described Patent Documents 1 through 3 disclose the detachable generator, the generator equipped with the ECU and the art of backing up data stored in the ECU. However, the Patent Documents 1 through 3 fail to disclose or suggest that either one of the ECUs should execute the operation control of the generator totally in the case where the battery is charged taking the condition of the battery into consideration.

The present invention has been made taking the above problems into consideration and has an object of providing an electric drive vehicle capable of preventing the operation control of a power generating unit from being confused between a control device on the power generating unit side and a control device on the electric drive vehicle side.

Means for Solving the Problems

The present invention for solving the above problems is an electric drive vehicle equipped with a power generating unit that is detachable, characterized in that: the power generating unit includes a first control device capable of controlling an operation of the power generating unit solely; the electric drive vehicle includes a second control device capable of managing a state of charge of a battery used for running; and in a case where the power generating unit is installed in the electric drive vehicle and power is supplied to the battery from the power generating unit, an instruction by the second control device is given priority to an instruction by the first control device, and the second control device controls the operation of the power generating unit.

Preferably, the present invention is characterized in that the second control device has a function of managing an operation control of the power generating unit to cope with a regulation, and controls the operation of the power generating unit under the regulation.

More preferably, the present invention is characterized by comprising: measurement means for measuring data for coping with the regulation; acquisition means for acquiring information about a type of the power generating unit; and table information in which the information about the type of the power generating unit, a measurement item by the measurement means and a decision criterion for satisfying the regulation are associated with each other, wherein the second control device changes either one or both of the measurement item and the decision criterion on the basis of the information about the type of the power generating unit acquired by the acquisition means and the table information, and controls the operation of the power generating unit on the basis of a changed measurement item and/or a changed decision criterion.

Effects of the Invention

According to the present invention, it is possible to prevent the operation control of the power generating unit from being confused between the control device on the power generating unit side and the control device on the electric drive vehicle side.

EMBODIMENTS FOR CARRYING OUT THE INVENTION

A description will now be given of embodiments for carrying out the invention with reference to the accompanying drawings.

Figure 1:
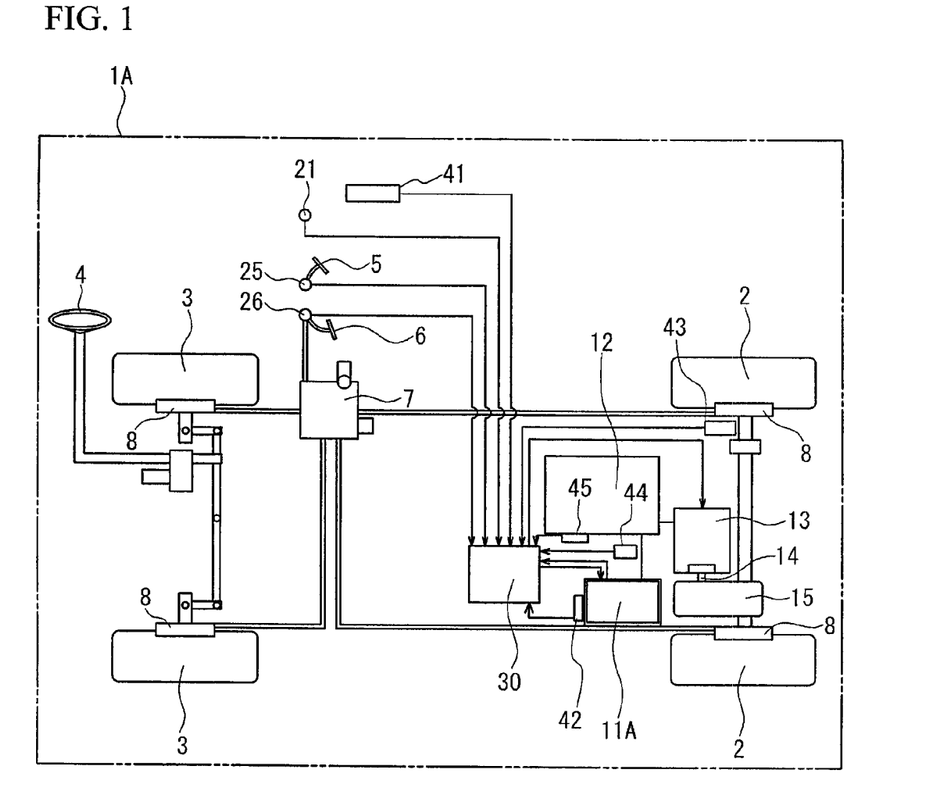
FIG. 1 is a diagram that schematically illustrates an electric drive vehicle 1A.

FIG. 1 is a diagram that schematically illustrates an electric drive vehicle 1A. Referring to FIG. 1, the electric drive vehicle 1A is equipped with a power generating unit 11A, a battery 12, and an electric motor 13. The power generating unit 11A is detachably installed in the electric drive vehicle 1A. The electric drive vehicle 1A with the power generating unit 11A being detachably installed can operate even in a state in which the power generating unit 11A is not installed and an electric connection with the power generating unit 11A is not made. Parts of the electric drive vehicle 1A other than the detachable power generating unit 11A form the vehicle main body. The power generating unit 11A may be of an engine driven type.

Figure 2:
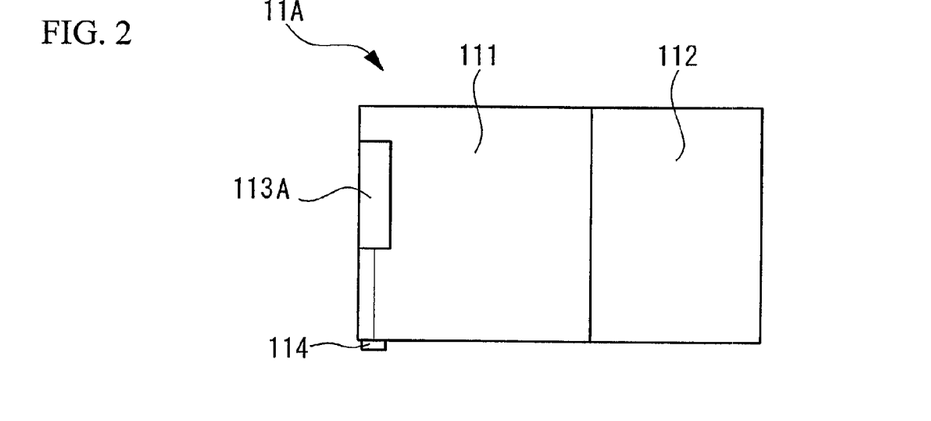
FIG. 2 is a diagram that schematically illustrates a power generating unit 11A.

FIG. 2 is a diagram that schematically illustrates the power generating unit 11A. The power generating unit 11A is equipped with an engine 111, a generator 112, a power generating unit side ECU (Electronic Control Unit) 113A, and an operation switch 114. The generator 112 may be an alternator, for example.

The engine 111 drives the generator 112, which generates alternating current. Then, the alternating current thus generated is converted to direct current by a rectifier circuit (which may, for example, be built in the generator 112 or installed in the electric drive vehicle 1A) before being charged in the battery 12. The ECU 113A on the power generating unit side is provided for primarily controlling the engine 111. The operation switch 114 is provided for starting and stopping the power generating unit 11A. More particularly, the operation switch 114 is a switch that enables the power generating unit 11A to operate and stop independently in a state in which electric connection with the vehicle main body is not made. The operation switch 114 is electrically connected to the ECU 113A on the power generating unit side. The ECU 113A on the power generating unit side periodically transmits a connection making signal to an vehicle side ECU 30, which will be described later. The ECU 30 on the vehicle side receives the connection making signal from the ECU 113A on the power generating unit side, and thus recognizes that the power generating unit 11A has been installed in the electric drive vehicle 1A. The ECU 113A on the power generating unit side receives a response signal from the ECU 30 on the vehicle side, and recognizes that a connection with the ECU 30 on the vehicle side has been made.

The battery 12 is a DC battery and is electrically connected to the power generating unit 11A detachably. The battery 12 may be configured to have multiple batteries having a rated voltage of 12 V connected in series. The electric motor 13 is a driving source and is a DC motor. The electric motor 13 is supplied with power from the battery 12 and rotates an output shaft 14. The rotary output is transmitted, via a transmission 15, to a pair of right and left rear wheels 2, which are driving wheels, so that the rear wheels 2 can be driven. As described above, the electric drive vehicle 1A is of a series hybrid type. The electric drive vehicle 1A is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8 coupled with the brake pedal 6 by wires, joined to the brake unit 7 and provided to the front wheels 2 and the rear wheels 3. The acceleration pedal 5 is provided with an acceleration position sensor 25 that senses the amount of depression of the acceleration pedal 5, and the brake pedal 6 is provided with a brake switch 26 that senses whether the brake pedal 6 is depressed or not.

The electric drive vehicle 1A is further provided with a key switch 21. The key switch 21 enables selective switching operation between ON and OFF. The key switch 21 is an operation means configured to issue an operation request to the power generating unit 11A and the electric motor 13. More particularly, when the key switch 21 is ON, the operation request is enabled. When the key switch 21 is OFF, the operation request is disabled.

Figure 3:
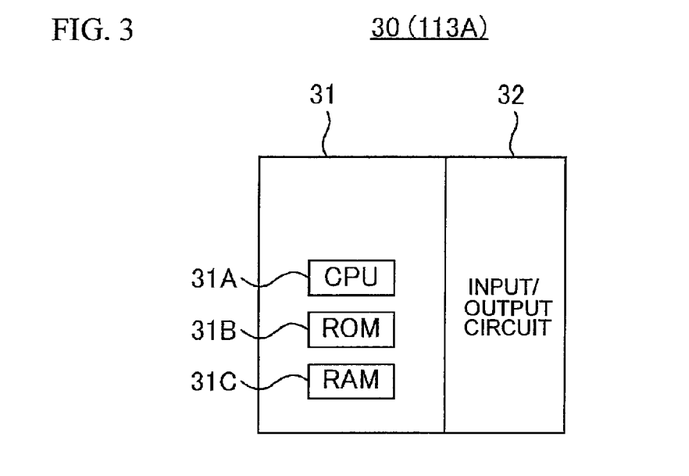
FIG. 3 is a diagram that illustrates a configuration of an ECU 30 on a vehicle side.

The electric device vehicle 1A is further provided with the ECU 30 on the vehicle side (acquisition means), which may be defined as a second control device. FIG. 3 is a diagram that illustrates a configuration of the ECU 30 on the vehicle side. The ECU 30 on the vehicle side is equipped with a microcomputer 31 including a CPU 31A, a ROM 31B, and a RAM 31C, and an input/output circuit 32. The ROM 31B is configured to store a program in which various processes executed by the CPU 31A are described and to store map data. The CPU 31A executes the processes on the basis of the program stored in the ROM 31B while using a temporary memory area ensured in the RAM 31C as necessary, so that various control means, determination means, detection means and calculation means can be functionally realized in the ECU 30 on the vehicle side and the ECU 113A on the power generating unit side.

The input/output circuit 32 inputs signals from various sensors and switches, and sends a drive signal to the electric motor 13. The ECU 113A on the power generating unit side, which may be defined as a first control device, may be configured similarly. The power generating unit 11A (more particularly, the ECU 113A on the power generating unit side) is electrically and detachably connected to the ECU 30 on the vehicle side. Various objects to be controlled such as the electric motor 13 are electrically connected to the ECU 30 on the vehicle side, and various sensors and switches such as the key switch 21, the acceleration position sensor 25 and the brake switch 26 are electrically connected thereto.

When the key switch 21 is OFF, the ECU 30 on the vehicle side is in a standby state in which various control operations may be executed appropriately as necessary. In the standby state, the ECU 30 is capable of, for example, detecting the states of sensors and switches, controlling the various control objects other than the electric motor 13, and outputting a drive request signal. In a case where multiple batteries that form the battery 12 and have a rated voltage of, for example, 12 V are installed, the ECU 30 on the vehicle side may be supplied with power from any one of the batteries.

Figure 4:
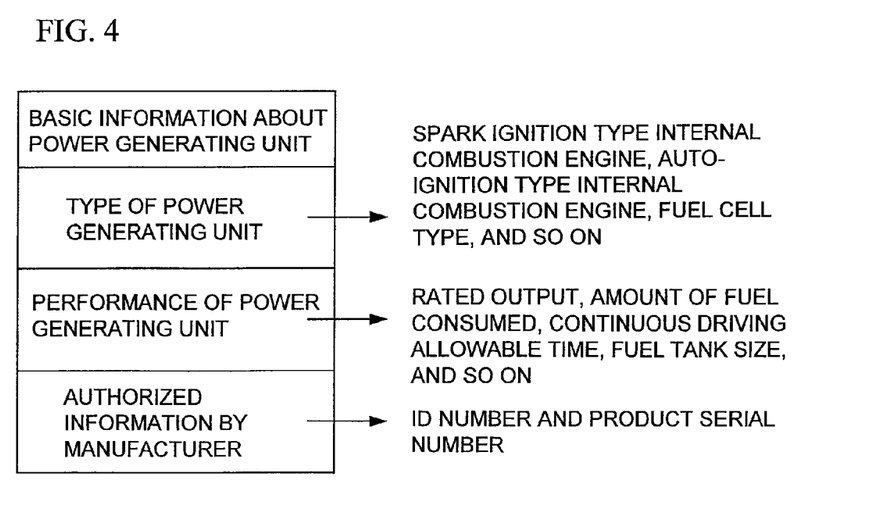
FIG. 4 is an illustration that describes basic information about the power generating unit 11A stored in a ROM 31B of an ECU 113A on a power generating unit side.

FIG. 4 is a diagram that illustrates basic information about the power generating unit 11A stored in the ROM 31B of the ECU 113A on the power generating unit side. Referring to FIG. 4, the basic information about the power generating unit 11A includes information about the type of the generator 112, information about the performance of the generator 112, and authorized information on the manufacturer. The information about the type of the generator 112 may be information that indicates, for example, a spark ignition type internal combustion engine, an auto-ignition type internal combustion engine, or a fuel cell type generator. The information about the performance of the generator 112 may be information that indicates, for example, the rated output, the amount of fuel consumed, the continuous traveling allowable time, and the size of the fuel tank. The authorized information on the manufacturer may include the ID number and the product serial number.

The basic information about the power generating unit 11A is read and recognized by the ECU 30 on the vehicle side. The ECU 30 on the vehicle side may read and recognize the basic information about the power generating unit 11A from the ECU 113A on the power generating unit side via radio communication. In this case, the ECU 30 on the vehicle side and the ECU 113A on the power generating unit side may be required to have connections with radio communication modules.

The basic information about the power generating unit 11A is not necessarily stored in the ROM 31B of the ECU 113A on the power generating unit side. For example, an QR code, a bar code or an ID tag that indicate the basic information about the power generating unit 11A may be attached to the power generating unit 11A beforehand. A reader, which is not illustrated, may read the QR code, bar code or ID tag, and may send the basic information about the power generating unit 11A to the ECU 30 on the vehicle side. Another method may be configured so that the user inputs the basic information about the power generating unit 11A by using an input device that is attached to the electric drive vehicle 1A and is not illustrated, and the ECU 30 on the vehicle side recognizes the basic information about the power generating unit 11A. Yet another method may be configured to physically engage the power generating unit 11A with the electric drive vehicle 1A and recognize the basic information about the power generating unit 11A by the ECU 30 on the vehicle side.

Since the basic information about the power generating unit 11A includes the authorized information by the manufacturer, the ECU 30 on the vehicle side can recognize whether the generator 112 is a generator authorized by the manufacturer or not. When the ECU 30 on the vehicle side recognizes the basic information about the power generating unit 11A, the ECU 30 on the vehicle side causes the basic information about the power generating unit 11A to be displayed on a display 41, which will be described later. Thus, it is possible for the user to confirm the performance of the generator 112 and to confirm whether the generator 112 is a generator authorized by the manufacturer.

Turning back to FIG. 1, the electric drive vehicle 1A is equipped with the display 41 on which information is displayed, an exhaust sensor 42 that detects an exhaust gas from the power generating unit 11A, a traveling distance detection sensor 43 for detecting the traveling distance, a leakage detection sensor 44 that detects leakage in charging the battery 12 by the power generating unit 11A, and a state-of-charge (SOC) detection sensor 45 that detects the state of charge of the battery 12. The display 41, the exhaust sensor 42, the traveling distance detection sensor 43, the leakage detection sensor 44 and the state-of-charge detection sensor 45 are connected to the ECU 30 on the vehicle side.

The ECU 30 on the vehicle side manages the quantity of the exhaust gas emitted from the power generating unit 11A on the basis of the output signal of the exhaust sensor 42. The ECU 30 on the vehicle side manages the state of charge on the basis of the output signal of the state-of-charge detection sensor 45. The ECU 30 on the vehicle side manages the traveling distance on the basis of the output signal of the traveling distance detection sensor 43. The ECU 30 on the vehicle side manages the amount of leakage on the basis of the output signal of the leakage detection sensor 44. The ECU 30 on the vehicle side calculates the fuel economy (the traveling distance per a charge amount of 1%) on the basis of the output signal of the state-of-charge detection sensor 45 and the output signal of the traveling distance detection sensor 43. The ECU 30 on the vehicle side executes a fault diagnosis of an electric system provided between the battery 12 and the power generating unit 11A on the basis of the output signal of the leakage detection sensor 44.

The exhaust sensor 42, the traveling distance detection sensor 43, the leakage detection sensor 44 and the state-of-charge detection sensor 45 are exemplary measurement means provided in the electric drive vehicle 1A in order to cope with a regulation imposed on the electric drive vehicle 1A, such as an emission regulation, a fuel regulation and an on-board diagnosis (OBD).

Figure 5:
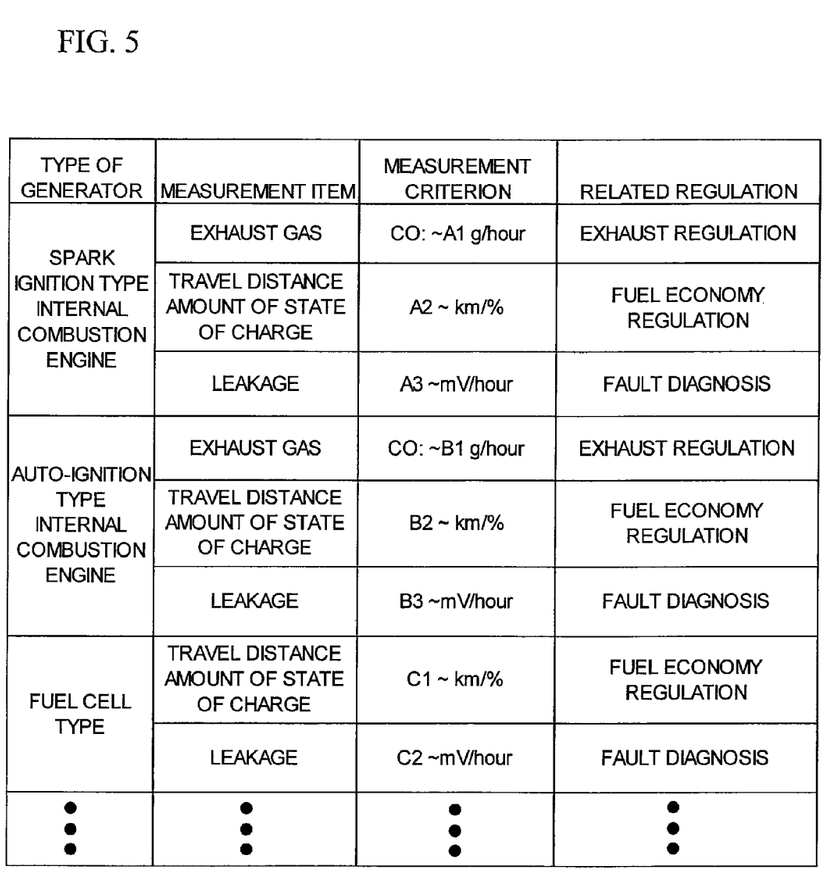
FIG. 5 is an illustration that describes table information stored in the ROM 31B of the ECU 30 on the vehicle side.

FIG. 5 illustrates an example of table information stored in the ROM 31B of the ECU 30 on the vehicle side. In the table information illustrated in FIG. 5, the types of the generator 112, the measurement items, the decision criteria and regulations are associated with each other. The measurement items indicate the contents of measurement prescribed in the corresponding regulations. For example, "exhaust gas", which is one of the measurement items, indicates measurement of exhaust gas by the exhaust sensor 42. By way of another example, "traveling distance and amount of state of charge", which is another one of the measurement items, indicates measurement of the traveling distance by the traveling distance detection sensor 43 and measurement of the amount of state of charge by the state-of-charge detection sensor 45. Further, "leakage", which is yet another example of the measurement items, indicates measurement of leakage by the leakage detection sensor 44. The decision criteria in FIG. 5 indicate criterion values defined in the corresponding regulations. For example, in a case of the spark ignition type internal combustion engine, the decision criterion value of the exhaust gas corresponding to the exhaust regulation is "CO: ~A1 g/hour". The values described in the column of the decision criterion in FIG. 5 (that is, A1~A3, B1~B3, C1, C2) are determined by the type of the generator and the regulations.

Figure 6:
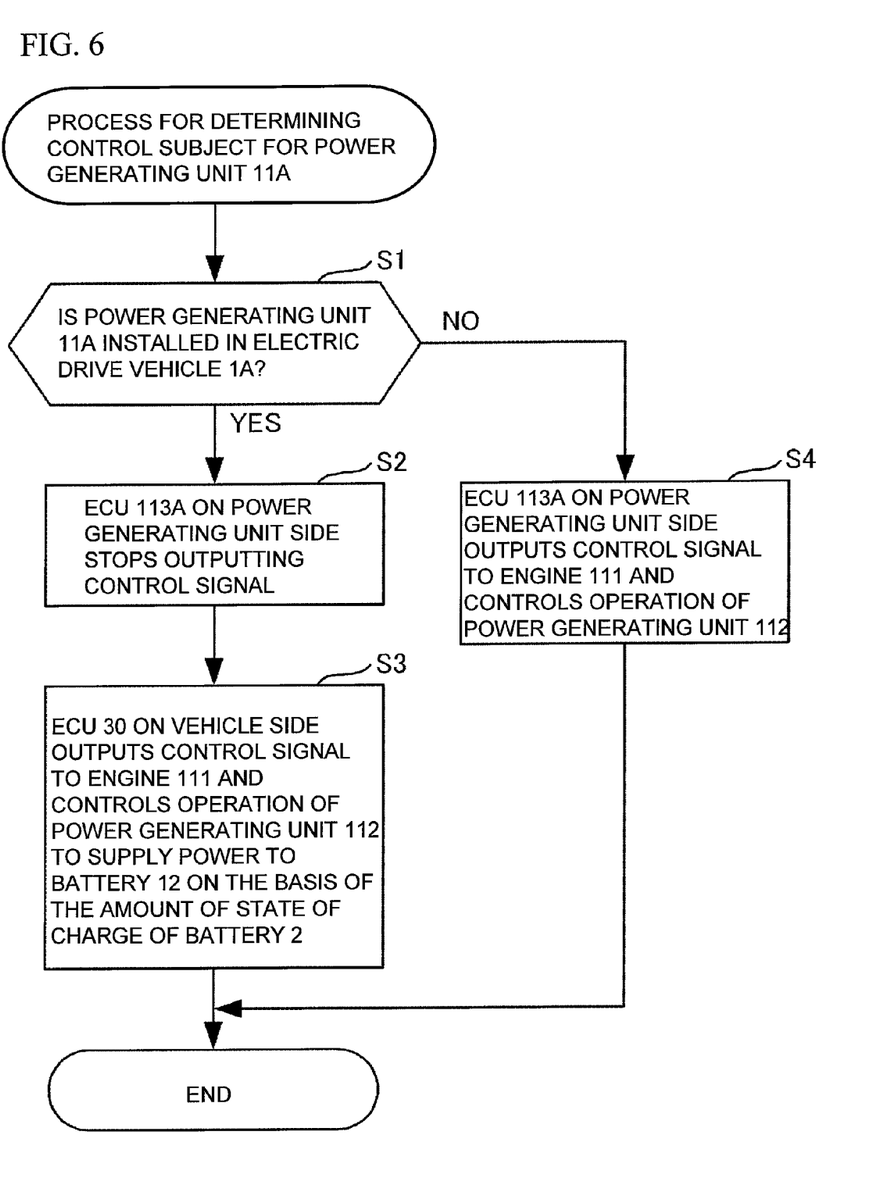
FIG. 6 is a flowchart of a process for determining a control subject for the power generating unit 11A.

FIG. 6 is a flowchart of a process for determining a control subject that controls the power generating unit 11A. First, the ECU 30 on the vehicle side determines whether the power generating unit 11A has been installed in the electric drive vehicle 1A (step S1). More particularly, the ECU 30 on the vehicle side recognizes that the power generating unit 11A has been installed in the electric drive vehicle 1A when receiving the connection making signal from the ECU 113A on the power generating unit side. In contrast, the ECU 30 on the vehicle side recognizes that the power generating unit 11A has not been installed in the electric drive vehicle 1A when not receiving the connection making signal from the ECU 113A on the power generating unit side.

In the case where the power generating unit 11A has been installed in the electric drive vehicle 1A (YES in step S1), the operation switch 114 of the power generating unit 11A is depressed, and the ECU 113A on the power generating unit side stops outputting a control signal for controlling the operation of the engine 111 (step S2). Then, the ECU 30 on the vehicle side outputs the control signal for controlling the engine 111 to the engine 111, and controls the operation of the generator 112 so that power is supplied to the battery 12 on the basis of the state of charge of the battery 12 (step S3).

The operation switch 114 in step S2 may be automatically depressed by a shape of an installation position when the power generating unit 11A is installed in the electric drive vehicle 1A or may be depressed by the user. In steps S2 and S3, the control subject that controls the generator is switched to the ECU 30 on the vehicle side from the ECU 113A from the power generating unit side in response to the depression of the operation switch 114 (physical means). However, a control may be employed to switch the control subject that controls the operation of the generator from the ECU 113A on the power generating unit side to the ECU 30 on the vehicle side. For example, in step S2, the ECU 30 on the vehicle side issues a stop instruction that stops outputting the control signal for controlling the operation of the engine 111 to the ECU 113A on the power generating unit side, and the ECU 113A receives the stop instruction and stops outputting the control signal for controlling the operation of the engine 111.

When the power generating unit 11A has not been installed in the electric drive vehicle 1A (NO in step S1), the ECU 113A on the power generating unit side outputs the control signal for controlling the operation of the engine 111 to the engine 111, and controls the operation of the generator 112 (step S4). In this case, the power generating unit 11A operates solely or stops.

In order to stop outputting the control signal for controlling the operation of the engine 111 in step S2, the ECU 113A on the power generating unit side may stop its operation totally. In steps S2 and S3, the ECU 113A on the power generating unit side may executes the basic control other than the operation control of the generator 112 (for example, reading or writing data from and in the ROM 31B), and the ECU 30 on the vehicle side may preferentially execute the control of the generator 112. In this case, the CPU 31A in the ECU 113A on the power generating unit side controls the input/output circuit 32 in the ECU 113A on the power generating unit side so that the control signal for controlling the operation of the engine 111 can be preferentially output to the engine 111.

The ECU 30 on the vehicle side may detect the state of charge of the battery 12 and calculate a requested power value that represents the amount of power to be charged on the basis of the detected state of charge, and may send the requested power value thus calculated to the ECU 113A on the power generating side responsible for controlling the engine 111. The ECU 113A on the vehicle side may execute the charge control of the battery by receiving the requested power value and controlling the engine 111 on the basis of the requested power value thus received. The information sent to the ECU 113A on the power generating unit side by the ECU 30 on the vehicle side is not limited to the requested power value. For example, as a requested instruction value, the ECU 30 on the vehicle side may send the ECU 113A on the power generating unit side a control parameter with which the engine output of the engine 111 may be controlled directly, such as the number of revolutions of the engine 111, the engine torque, the quantity of fuel injected, the quantity of intake air, or the throttle angle. In this case, the ECU 113A on the power generating unit side complies with the requested instruction value sent by the ECU 30 on the vehicle side, and the ECU 30 on the vehicle side may control the engine in preference to the ECU 113A on the power generating unit side.

According to steps S1 through S4 in FIG. 6, it is possible to definitely distinguish the ECU 30 on the vehicle side that controls the operation of the generator 112 only when the power generating unit 11A is connected to the electric drive vehicle 1A over the ECU 113A on the power generating unit side that controls the operation of the generator 112 only when the power generating unit 11A is not connected to the electric drive vehicle 1A. It is thus possible to avoid the confusion in the operation control of the generator 112 between the ECU 113A on the power generating unit side an the ECU 30 on the vehicle side. Since the operation control of the generator 112 is definitely shared by the ECU 30 on the vehicle side and the ECU 113A on the power generating unit side, the structures of both the ECUs may be simplified. It is further possible to simplify the control signal for controlling the operation of the engine 111.

The ECU 30 on the vehicle side may be a sophisticated ECU that manages at least the state of charge of the battery 12, while the ECU 113A on the power generating unit side may be an ECU enabling a fixed-point operation at the highest. Thus, it is possible to achieve cost reduction as compared to a case where the ECU 30 on the vehicle side and the ECU 113A on the power generating unit side are sophisticated ECUs. The fixed-point operation means a state where the power generating unit 11A is not obliged to operate under the regulations and is operating solely. When the power generating unit 11A has not been installed in the electric drive vehicle 1A, the fixed-point operation may be kept because the ECU 113A on the power generating unit side is not needed to execute any control based on the output signals of the various sensors.

Figure 7:
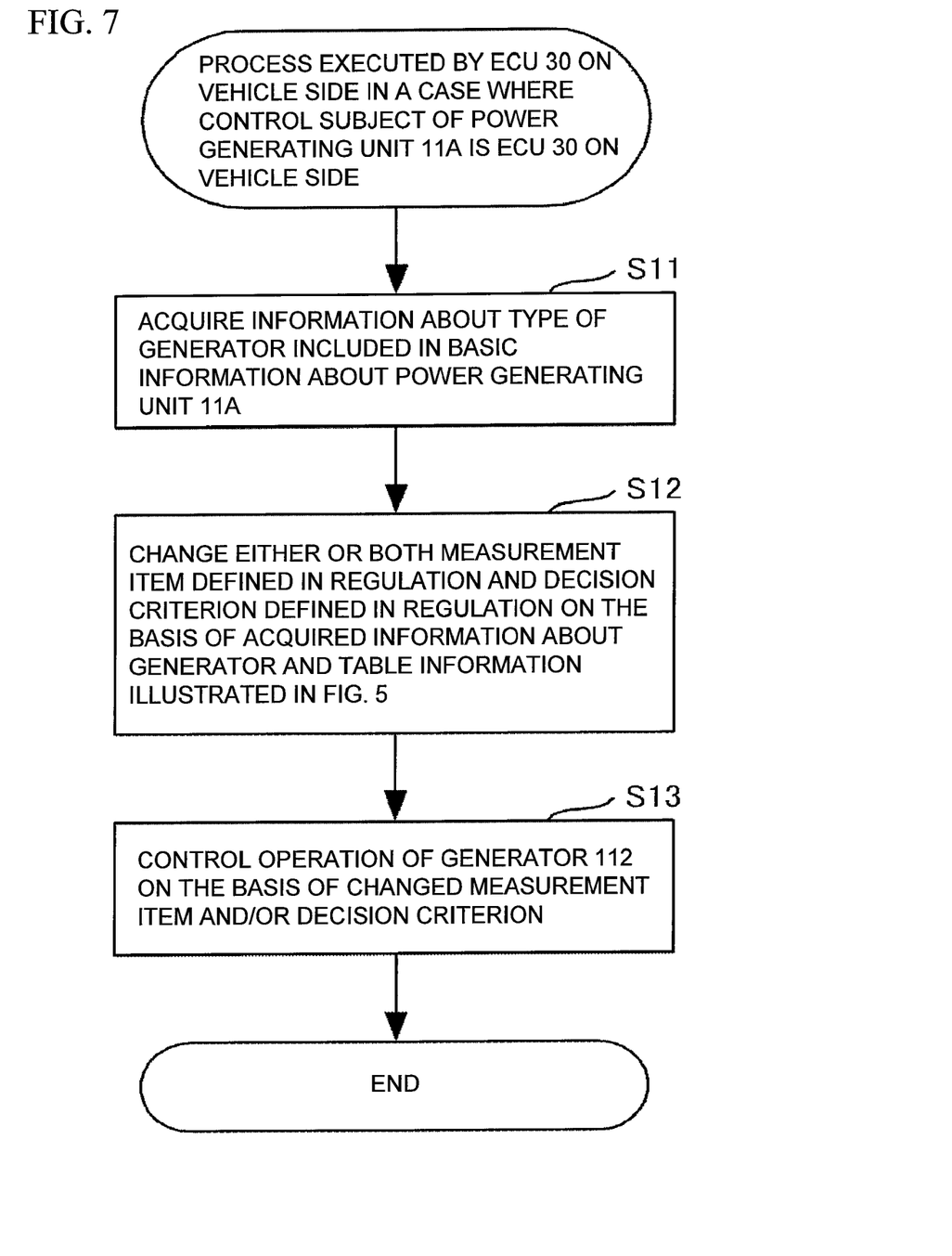
FIG. 7 is a flowchart of a process executed by the ECU 30 on a vehicle side in a case where the control subject for the power generating unit 11A is the ECU 30 on the vehicle side.

FIG. 7 is a flowchart of a process executed by the ECU 30 on the vehicle side when the control subject that controls the power generating unit 11A is the ECU 30 on the vehicle side (that is, the power generating unit 11A has been installed in the electric drive vehicle 1A).

The ECU 30 on the vehicle side acquires the basic information about the power generating unit 11A illustrated in FIG. 4 and acquires information about the type of the generator included in the basic information about the power generating unit 11A (step S11). As has been described above, the ECU 30 on the vehicle side can acquire the basic information about the power generating unit 11A from the ROM 3 of the ECU 113A on the power generating unit side. The ECU 30 on the vehicle side can acquire the basic information about the power generating unit 11A by reading the QR code, bar code or ID tag attached to the power generating unit 11A and indicative of the basic information about the power generating unit 11A. The ECU 30 on the vehicle side can acquire the basic information about the power generating unit 11A in such a manner that the user inputs the basic information about the power generating unit 11A through an input device not illustrated.

Next, the ECU 30 on the vehicle side changes either one or both of the measurement item defined by the regulation or the decision criterion defined by the regulations on the basis of the acquired information about the type of the generator and the table information in FIG. 5 (step S12). The ECU 30 on the vehicle side controls the operation of the generator 112 on the basis of the changed measurement item and/or decision criterion (step S13). At this time, the ECU 113A on the power generating unit side controls the input/output circuit 32 in the ECU 113A on the power generating unit side so that the ECU 113A stops operating or the ECU 30 on the vehicle side preferentially controls the operation of the generator 112.

As described above, the ECU 30 on the vehicle side has the function of managing the operation control of the power generating unit 11A so as to cope with the various regulations, that is, the function of executing steps S11 through S13.

According to the process illustrated in FIG. 7, the ECU 30 on the vehicle side can operate the generator so as to cope with the regulations on the basis of the type of the generator installed in the electric drive vehicle 1A. Even when the contents of the control of the generator 112 are changed due to the regulations imposed on the vehicle, the electric drive vehicle 1A can cope with the regulations by updating the control program of the ECU 30 on the vehicle side.

As has been described, according to the present embodiment, in the case where the power generating unit 11A is installed in the electric drive vehicle 1A and supplies the battery 12 with power, the instructions by the ECU 30 on the vehicle side are given priority over those by the ECU 113A on the power generating unit side. It is thus possible to avoid the confusion in the operation control of the generator 112 between the ECU 113A on the power generating unit side the ECU 30 on the vehicle side.

The ECU 30 on the vehicle side has the function of managing the operation control of the power generating unit 11A directed to coping with the regulations and controls the power generating unit 11A under the regulations. Thus, even when the ECU 113A on the power generating unit side does not cope with the regulations, by installing the power generating unit 11A in the electric drive vehicle 1A, the ECU 30 on the vehicle side can automatically control the operation of the power generating unit 11A under the regulations.

In the present embodiment, the measurement means for coping with the regulations implied on the vehicle is provided in the electric drive vehicle 1A. It is thus possible to simplify the structure and wirings of the ECU 113A on the power generating unit side and reduce the cost of fabricating the power generating unit 11A and to downsize the power generating unit 11A. The measurement means may be at least one of the exhaust sensor 42, the traveling distance detection sensor 43, the leakage detection sensor 44 and the state-of-charge detection sensor 45.

The power generating unit 11A does not consider the position on the electric drive vehicle 1A in which the power generating unit 11A is installed as long as the power generating unit 11A is connectable to the ECU having the function of coping with the regulations, that is, the power generating unit 11A is connectable to the ECU 30 on the vehicle side. Thus, the degree of freedom of the position in which the power generating unit 11A is installed can be improved.

The ECU having the function of coping with the regulations, that is, the ECU 30 on the vehicle side is provided in the vehicle, and is left even when the power generating unit 11 is brought out of the vehicle. It is thus possible to reduce the risk of damage of the ECU having the function of coping with the regulations.

The present invention is not limited to the above-described embodiments, but may be carried out variously without departing from the essence of the invention

DESCRIPTION OF REFERENCE NUMERALS 1A electric drive vehicle
11A power generating unit
12 battery
30 ECU on a vehicle side
41 display
42 exhaust sensor
43 traveling distance detection sensor
44 leakage detection sensor
45 state-of-charge detection sensor
111 engine
112 generator
113A ECU on a power generating unit side
114 operation switch

The invention claimed is:

1. An electric drive vehicle comprising a power generating unit that is detachable, wherein:
    the power generating unit includes a first control device capable of controlling an operation of the power generating unit solely;
    the electric drive vehicle includes a second control device capable of managing a state of charge of a battery used for running; and
    in a case where the power generating unit is installed in the electric drive vehicle and power is supplied to the battery from the power generating unit, an instruction by the second control device is given priority to an instruction by the first control device, and the second control device controls the operation of the power generating unit.

2. The electric drive vehicle according to claim 1, wherein the second control device has a function of managing an operation control of the power generating unit to cope with a regulation, and controls the operation of the power generating unit under the regulation.

3. The electric drive vehicle according to claim 2, comprising:
    a measurement device that measures data for coping with the regulation;
    an acquisition device that acquires information about a type of the power generating unit; and
    table information in which the information about the type of the power generating unit, a measurement item by the measurement device and a decision criterion for satisfying the regulation are associated with each other,
    wherein the second control device changes either one or both of the measurement item and the decision criterion on the basis of the information about the type of the power generating unit acquired by the acquisition device and the table information, and controls the operation of the power generating unit on the basis of a changed measurement item and/or a changed decision criterion.

* * * * *